United States Patent
Aly et al.

(10) Patent No.: US 11,161,759 B2
(45) Date of Patent: Nov. 2, 2021

(54) ELECTROCOAGULATION CELL DESIGN

(71) Applicant: QATAR UNIVERSITY, Doha (QA)

(72) Inventors: Deina T. Aly, Doha (QA); Muftah H. El-Naas, Doha (QA)

(73) Assignee: QATAR UNIVERSITY, Doha (QA)

(*) Notice: Subject to any disclaimer, the term of this patent is extended or adjusted under 35 U.S.C. 154(b) by 11 days.

(21) Appl. No.: 16/160,786

(22) Filed: Oct. 15, 2018

(65) Prior Publication Data

US 2020/0115261 A1 Apr. 16, 2020

(51) Int. Cl.
*C02F 1/463* (2006.01)
*C02F 1/461* (2006.01)
*C02F 103/10* (2006.01)

(52) U.S. Cl.
CPC ......... *C02F 1/46109* (2013.01); *C02F 1/463* (2013.01); *C02F 2001/46133* (2013.01); *C02F 2001/46171* (2013.01); *C02F 2103/10* (2013.01); *C02F 2201/4618* (2013.01); *C02F 2201/4619* (2013.01)

(58) Field of Classification Search
CPC .................. C02F 1/463; C02F 1/465
See application file for complete search history.

(56) References Cited

U.S. PATENT DOCUMENTS

| | | | | |
|---|---|---|---|---|
| 5,364,529 | A * | 11/1994 | Morin | C02F 3/04 210/195.3 |
| 8,551,305 | B2 * | 10/2013 | Behr | C02F 1/463 204/267 |
| 2009/0008267 | A1 * | 1/2009 | Del Signore | C02F 1/463 205/744 |
| 2012/0160706 | A1 * | 6/2012 | Poirier | C02F 1/4674 205/756 |
| 2016/0075572 | A1 * | 3/2016 | Tandukar | C02F 1/463 205/758 |

OTHER PUBLICATIONS

Abdelwahab, et al., "Electrochemical removal of phenol from oil refinery wastewater," *Journal of Hazardous Materials* 2009, vol. 163, No. 2-3, pp. 711-716, Jul. 12, 2008.

Can, et al., "Treatment of the textile wastewater by combined electrocoagulation," *Chemosphere* 2006, vol. 62, No. 2, pp. 181-187, Jul. 5, 2005.

Chaudhary and Sahu, "Treatment of Sugar Waste Water by Electrocoagulation," *Journal of Atmospheric Pollution* 2013, vol. 1, No. 1, pp. 5-7.

El-Ashtoukhy, et al., "Treatment of petrochemical wastewater containing phenolic compounds by electrocoagulation using a fixed bed electrochemical reactor," *Int. J. Electrochem. Sci.*, vol. 8, No. 1, pp. 1534-1550, Jan. 1, 2013.

El-Ashtoukhy, et al., "Treatment of paper mill effluents in a batch-stirred electrochemical tank reactor," *Chemical Engineering Journal* 2009, vol. 146, No. 2, pp. 205-210.

(Continued)

*Primary Examiner* — Salil Jain
(74) *Attorney, Agent, or Firm* — Squire Patton Boggs (US) LLP

(57) ABSTRACT

Embodiments of the present invention encompass electrodes, electrochemical cells, electrocoagulation systems, and methods using the electrodes, electrochemical cells, electrocoagulation systems. The electrodes may be used in electrocoagulation cells and/or systems to treat water.

6 Claims, 9 Drawing Sheets

(56) References Cited

OTHER PUBLICATIONS

Hamdan and El-Naas, "An electrocoagulation column (ECC) for groundwater purification," *Journal of Water Process Engineering*, vol. 4, pp. 25-30, Sep. 26, 2014.

Kobya, et al., "Arsenic removal from groundwater of Şivas-şarkişla Plain, Turkey by electrocoagulation process: Comparing with iron plate and ball electrodes," *Journal of Environmental Chemical Engineering*, vol. 3, No. 2, pp. 1096-1106, Apr. 21, 2015.

Mountassir, et al., "Potential use of clay in electrocoagulation process of textile wastewater: Treatment performance and flocs characterization," *Journal of Environmental Chemical Engineering*, vol. 3, No. 4, Part A, pp. 2900-2908, Oct. 9, 2015.

Ni'am and Othman, "Experimental Design of Electrocoagulation and Magnetic Technology for Enhancing Suspended Solids Removal from Synthetic Wastewater," *International Journal of Science and Engineering*, vol. 7, No. 2, pp. 178-192, Oct. 2014.

Narayanan and Ganesan, "Use of adsorption using granular activated carbon (GAC) for the enhancement of removal of chromium from synthetic wastewater by electrocoagulation," *Journal of Hazardous Materials* 2009, vol. 161, No. 1, pp. 575-580, Apr. 3, 2008.

\* cited by examiner

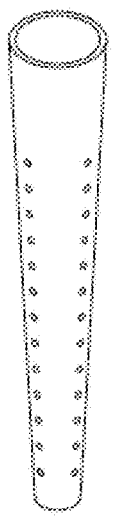
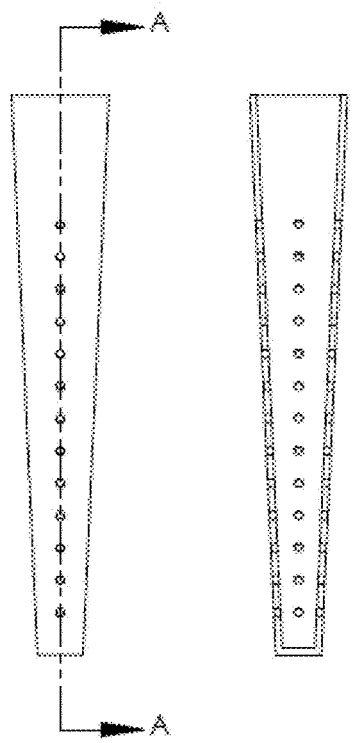
Figure 4A
Figure 4B

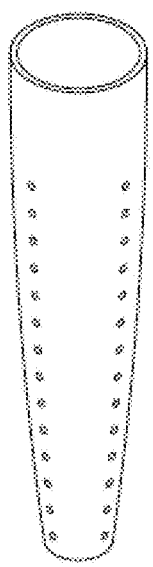
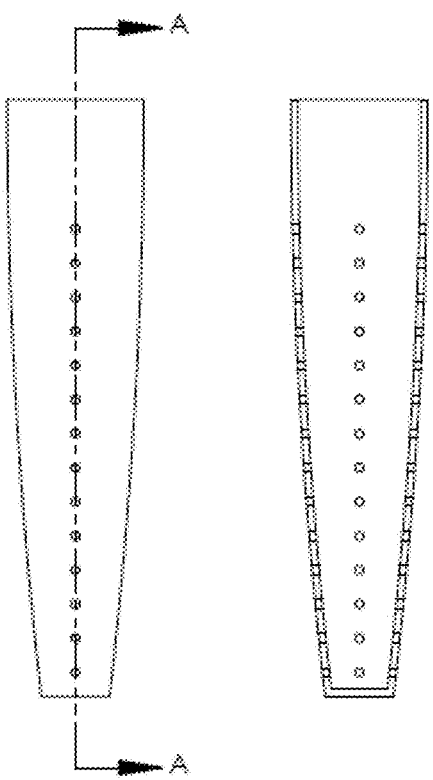
Figure 4C
Figure 4D

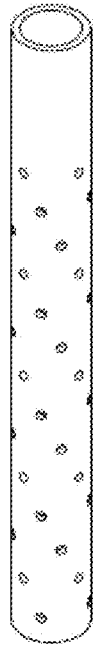 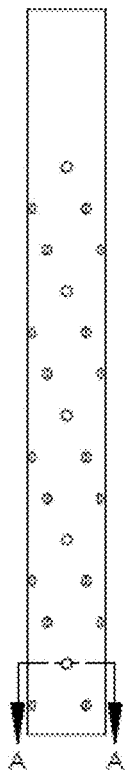 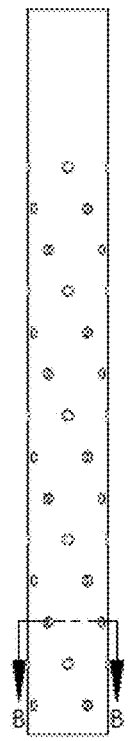 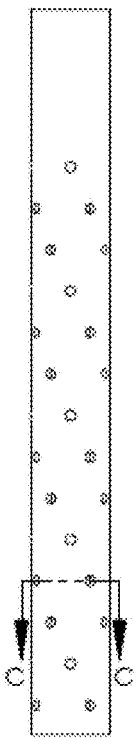
  
       Figure 5A    Figure 5B    Figure 5C Figure 7: Dimensions of the cylindrical electrode (mm)

ELECTROCOAGULATION CELL DESIGN

FIELD OF THE INVENTION

This invention describes electrodes, electrochemical cells, and the use of an electrochemical cell for water treatment.

BACKGROUND OF THE INVENTION

The discussion that follows is intended solely as background information to assist in the understanding of the invention herein; nothing in this section is intended to be, nor is it to be construed as, prior art to this invention.

Hydraulic fracturing used to extract oil and gas results in a by-product referred to as "produced water." Produced water is a combination of water injected into the formation to stimulate production of oil and gas. The injected water is then extracted along with the oil and gas. The injected water may also mix with the naturally occurring water in the formation, referred to as "formation water." Thus, produced water may be contaminated, and may need to be treated and/or reinjected into deep porous formations.

Methods of treating wastewater, such as, but not limited to, produced water, include electrochemical methods. One such electrochemical method is electrocoagulation. Electrocoagulation is a method combining electrochemistry, coagulation and flocculation. Although the generic use of electrochemical methods for water treatment are old, efforts have been made to improve electrochemical methods for water treatment. Some of these methods are described by Nia'm & Othman (M. F. Ni'am and F. Othman, "Experimental Design of Electrocoagulation and Magnetic Technology for Enhancing Suspended Solids Removal from Synthetic Wastewater," *International Journal of Science and Engineering*, vol. 7, no. 2, pp. 178-192, 2014), Hamdan and El-Naas (S. S. Hamdan and M. H. El-Naas, "An electrocoagulation column (ECC) for groundwater purification," *Journal of Water Process Engineering*, vol. 4, pp. 25-30, December 2014), Kobya et al., (M. Kobya, F. Ozyonar, E. Demirbas, E. Sik, and M. S. Oncel, "Arsenic removal from groundwater of Sivas-Şarkişla Plain, Turkey by electrocoagulation process: Comparing with iron plate and ball electrodes," *Journal of Environmental Chemical Engineering*, vol. 3, no. 2, pp. 1096-1106, 6//20150, El-Ashtoukhy et al. (E. S. Z. El-Ashtoukhy, N. K. Amin, and O. Abdelwahab, "Treatment of paper mill effluents in a batch-stirred electrochemical tank reactor," *Chemical Engineering Journal*, vol. 146, no. 2, pp. 205-210, 2/1/20090, Abdelwahab et al. (O. Abdelwahab, N. K. Amin, and E. S. Z. El-Ashtoukhy, "Electrochemical removal of phenol from oil refinery wastewater," *Journal of Hazardous Materials*, vol. 163, no. 2-3, pp. 711-716, Apr. 30, 2009), El-Ashtoukhy et al. (E. El-Ashtoukhy, Y. El-Taweel, O. Abdelwahab, and E. Nassef, "Treatment of petrochemical wastewater containing phenolic compounds by electrocoagulation using a fixed bed electrochemical reactor," *Int. J. Electrochem. Sci.*, vol. 8, no. 1, pp. 1534-1550, 20130, Chaudhary and Sahu (R. Chaudhary and O. P. Sahu, "Treatment of Sugar Waste Water by Electrocoagulation," *Journal of Atmospheric Pollution*, vol. 1, no. 1, pp. 5-7, 2013), Narayanan and Ganesan (N. Vivek Narayanan and M. Ganesan, "Use of adsorption using granular activated carbon (GAC) for the enhancement of removal of chromium from synthetic wastewater by electrocoagulation," *Journal of Hazardous Materials*, vol. 161, no. 1, pp. 575-580, Jan. 15, 2009), Mountassir et al. (Y. Mountassir, A. Benyaich, P. Berçot, and M. Rezrazi, "Potential use of clay in electrocoagulation process of textile wastewater: Treatment performance and flocs characterization," *Journal of Environmental Chemical Engineering*, vol. 3, no. 4, Part A, pp. 2900-2908, December 2015), and Can et al. (O. T. Can, M. Kobya, E. Demirbas, and M. Bayramoglu, "Treatment of the textile wastewater by combined electrocoagulation," *Chemosphere*, vol. 62, no. 2, pp. 181-187, January 2006).

Improved methods of electrocoagulation are needed and improved electrodes are needed.

SUMMARY OF THE INVENTION

Aspects of the present invention are directed to electrodes, electrochemical cells, electrocoagulation systems, and methods of water treatment. In some embodiments of the present invention, an article, that may be used as an electrode for an electrochemical cell, is formed from one or more materials where the one or more materials include, but are not limited to including, a metal; and the article includes, but is not limited to including, a conduit, one or more access openings to access the conduit, and one or more distribution openings providing access to the conduit. An article formed from one or more materials where one material is a metal alloy is an article formed from one or more materials where the one or more materials include, but are not limited to including, a metal because a metal alloy includes at least one metal. In some embodiments, the cross-sectional area of the largest of the distribution openings is not more than 5% of the average cross-sectional area of the conduit, not more than 5% of the area of the cross-sectional area of the access opening (or the smallest access opening if multiple access openings), or both. The conduit allows for flow of a fluid, such as but not limited to air, into the access opening(s) and out through the distribution opening(s).

Embodiments of the present invention also include electro-chemical cells, electrocoagulation systems, and methods of treatment of wastewater using these electrodes.

DESCRIPTION OF THE DRAWINGS

FIGS. 4A-4D depict two additional non-limiting embodiments of electrodes of the present invention with the three dimensional view shown in FIGS. 4A and 4C, and the corresponding lengthwise cross-section shown in FIGS. 4C and 4D, respectively.

FIGS. 5A-5C depict another non-limiting embodiment of an electrode of the present invention with three circumferential cross-sections.

DETAILED DESCRIPTION

Figure 1:
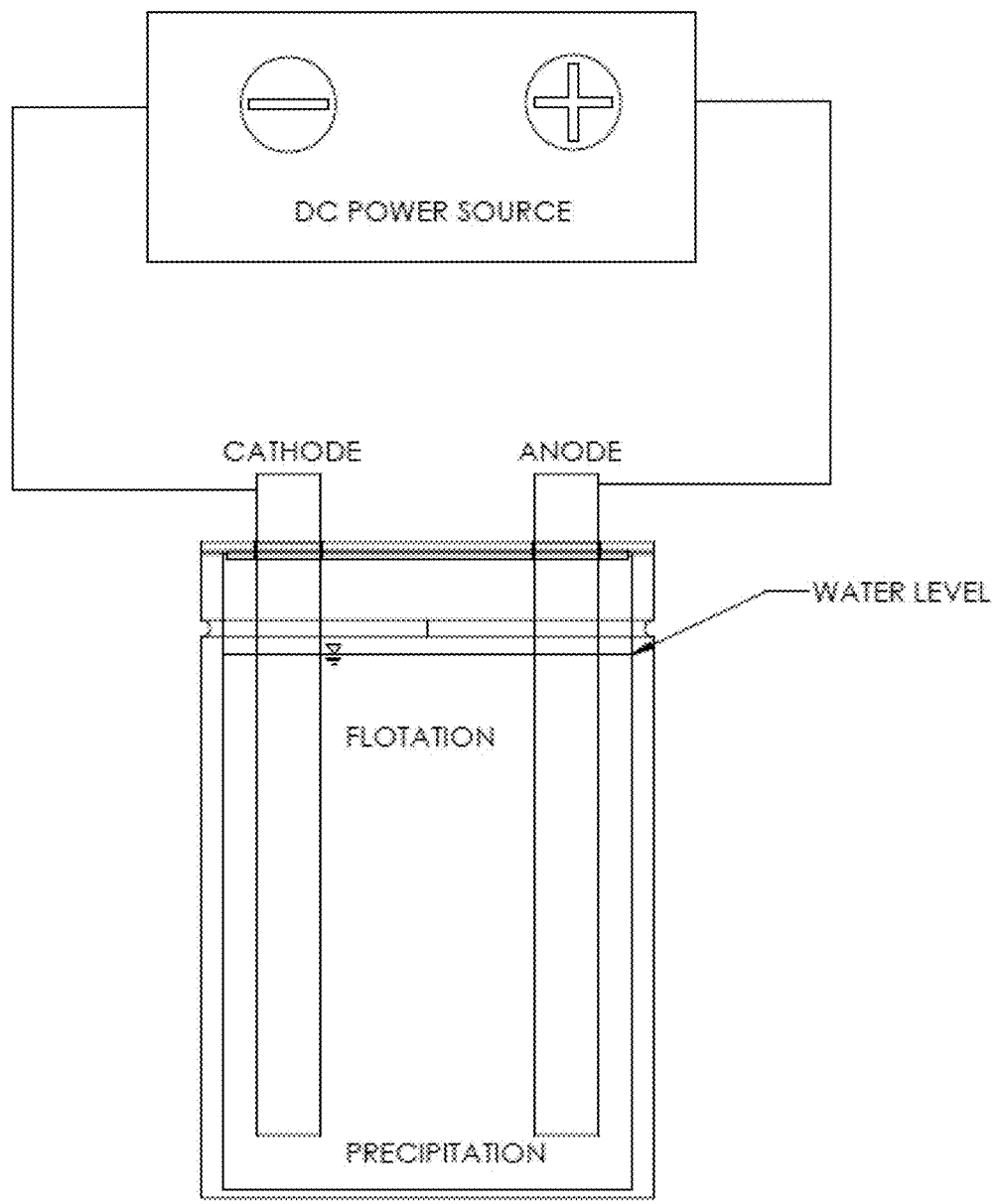
FIG. 1 depicts an exemplary experimental set-up for electrocoagulation.

The term "as used herein" applies to the entire disclosure and expressly includes the specification, claims, and drawings.

Use of the singular herein includes the plural and vice versa unless expressly stated to be otherwise. That is, "a" and "the" refer to one or more of whatever the word modifies. For example, "a device" may refer to one device, two devices, etc. Likewise, "the metal" may mean one metal or a plurality of metals. By the same token, words such as, without limitation, "devices" and "metals" would refer to one device or metal as well as to a plurality of devices or metals unless it is expressly stated or obvious from the context that such is not intended.

As used herein, words of approximation such as, without limitation, "about," "substantially," "essentially," and "approximately" mean that the word or phrase modified by the term need not be exactly that which is written but may vary from that written description to some extent. The extent to which the description may vary from the literal meaning of what is written, that is the absolute or perfect form, will depend on how great a change can be instituted and have one of ordinary skill in the art recognize the modified version as still having the properties, characteristics and capabilities of the modified word or phrase. In general, but with the preceding discussion in mind, a numerical value herein that is modified by a word of approximation may vary from the stated value by ±15%, unless expressly stated otherwise.

As used herein, the phrases "any combination of" and "a combination of" followed by a list joined by the conjunction "and," means any combination of two or more articles of the group where the group members are the members of the list joined by the conjunction "and." As a non-limiting example, "any combination of A, B, C, and D" encompasses the following combinations: A and B; A and C; A and D; B and C; B and D; C and D; A, B, and C; A, B, and D; A, C, and D; B, C, and D; A, B, C, and D. Similarly, the phrase "A, B, C, D, or any combination thereof" encompasses an individual member (A, B, C, D) or any combination of A, B, C, and D, as outlined above. The phrase "A, B, C, D, or a combination thereof" encompasses an individual member (A, B, C, D) or any combination of A, B, C, and D, as outlined above. Similarly, the phrase "X is selected from the group consisting of A, B, C, D, and combinations thereof" (or a variant such as "X is selected from the group consisting of A, B, C, D, and all combinations thereof") encompasses X being an individual member of the group (A, B, C, D) or any combination of the A, B, C, and D, as outlined above. In addition, "combination thereof" also encompasses a combination of two or more members of A if A is a genus, etc. As a specific example, if A is a genus "any combination of A, B, C, and D" encompasses a combination of two or more members of A (for example, the combination A1 and A2, where A1 and A2 are members of the genus A), as well as the following, where A is replaced by "one or more members of A": A and B; A and C; A and D; B and C; B and D; C and D; A, B, and C; A, B, and D; A, C, and D; B, C, and D; A, B, C, and D (one or more members of A and B; one or more members of A and C, etc.). The same would apply if B and/or C were a genus, etc.

As used herein, the phrase "and/or" means a combination or an individual member. As a non-limiting example, "X is A, B, and/or C" encompasses the following possibilities: X is A; X is B; X is C; X is any combination of A, B, and C (A and B; A and C; B and C; A, B, and C). Similarly, if A is a genus, X could be a combination of A1 and A2, where A1 and A2 are members of the genus A (or generally, X could be two or more members of A), and one or more members of A would replace A in the example of the previous sentence. The same would apply if B and/or C were a genus, etc.

As used herein, any ranges presented are inclusive of the end-points. For example, "a weight % between 1% and 10%" or "a weight % from 1% to 10%" includes 1 weight % and 10 weight %, as well as any weight % in between, including fractions such as, but not limited to, 2.5%. In other words, the description of a range should be considered to have specifically disclosed all the possible subranges as well as individual numerical values within that range. As an example, a description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Unless expressly indicated, or from the context clearly limited to integers, a description of a range such as from 1 to 6 should be considered to have specifically disclosed subranges 1.5 to 5.5, etc., and individual values such as 3.25, etc. that is non-integer individual values and ranges beginning with, ending with or both beginning with and ending with a non-integer value(s). This applies regardless of the breadth of the range.

As used herein, a range may be expressed as from "about" one particular value and/or to "about" another particular value, for example from about 5 to about 10. When such a range is expressed, another embodiment is included, the embodiment being from one particular value and/or to the other particular value. Similarly, when values are expressed as approximations by use of the antecedent "about," it will be understood that the particular value forms another embodiment. As an example, the disclosure of the range "about 5 to about 10" also discloses the range "5 to 10." Similarly, the disclosure of "a temperature of about 100° C." is equivalent to also disclosing "a temperature of 100° C."

As used herein, a "hole" is an opening or a channel in a material created by any one or more of a combination of etching, laser machining, mechanical machining, drilling, and conventional processes known by persons of ordinary skill in the art. The location of holes may be predetermined.

As used herein, a "pore" is an opening or channel in a material that naturally results from the properties of the material. The location of pores may not be pre-determined.

As used herein, "wt. %", "wt. %" and "wt %" refer to percent by weight.

Aspects of the present invention are directed to electrodes, electrochemical cells, electrocoagulation systems, and methods of water treatment. FIG. 1 depicts an exemplary electrocoagulation system with an anode and a cathode that are partially immersed in the water to be treated while a current is applied to the anode and cathode. The anode and cathode are made of materials including a metal. Commonly used metals include, but are not limited to, iron and aluminum (and combinations of these). When current passes through the anode, metal cations are released into the water, and at the cathode, hydrogen gas evolves and OH$^-$ ions (anions) are released. The metal cations (for example, M$^{+2}$ where M=metal) and OH$^-$ ions may react to form a precipitate (for example, M(OH)$_2$) that entraps at least some pollutants upon precipitation. The hydrogen gas bubbles may assist in floatation of some pollutants.

Figure 2:
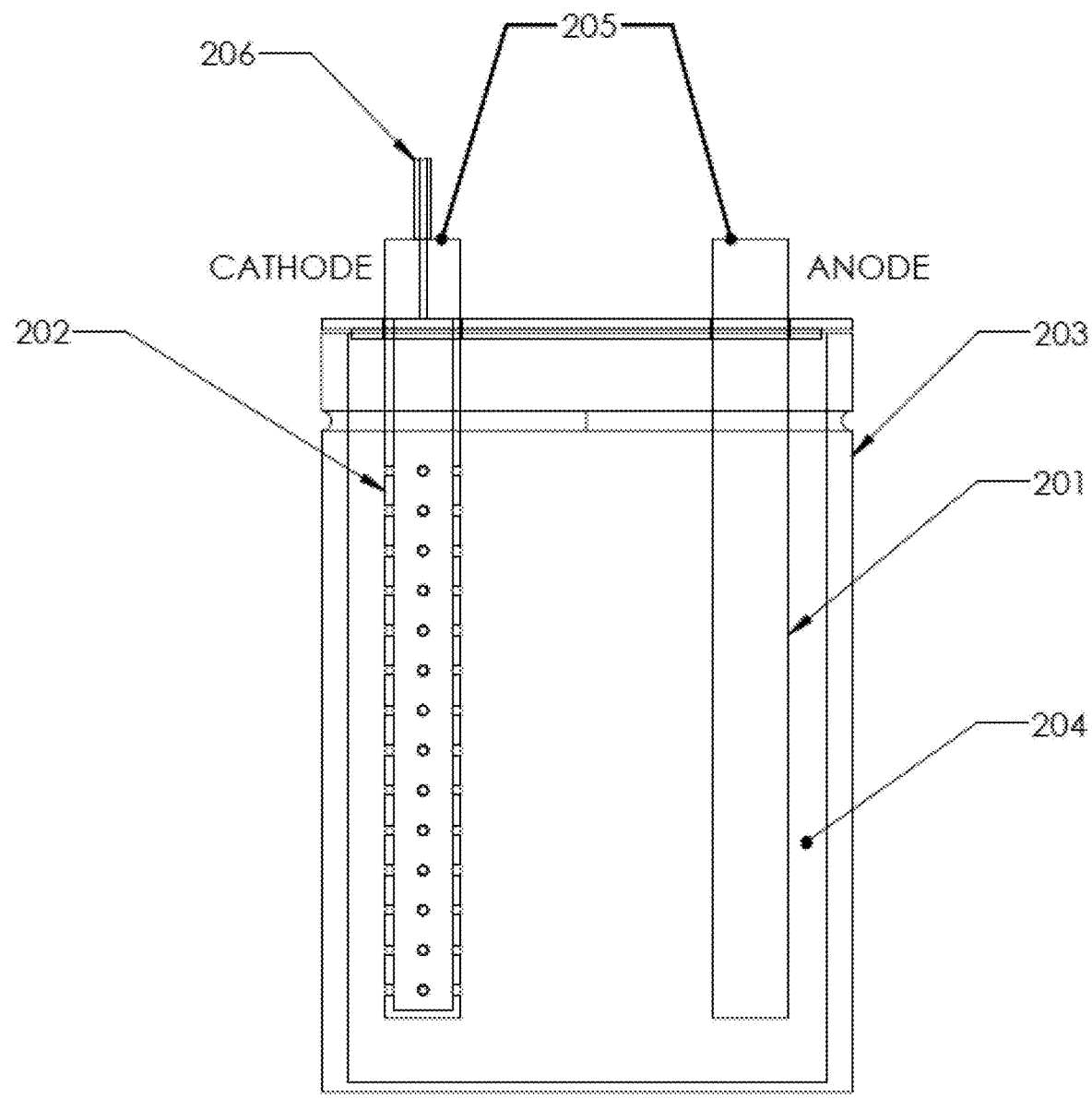
FIG. 2 depicts a non-limiting embodiment of an electrochemical cell of the present invention.

As noted above, aspects of the present invention are directed to electrodes, electrochemical cells, electrocoagulation systems, and methods of water treatment. One exemplary, and non-limiting, embodiment is illustrated in FIG. 2 where an anode 201 and a cathode 202 are partially immersed in an aqueous solution/suspension ("water" or "wastewater") 204 to be treated contained in a vessel 203. Both the anode and the cathode are connected to a power supply 205 that can supply a current to the electrodes. The anode is a solid cylinder that is formed from one or more metals and/or one or more metal alloys. The cathode is also formed from one or more metals and/or one or more metal alloys. However, the cathode is hollow cylinder with one end closed and one end including an opening, and with perforations along the wall of the cylinder. The cathode is attached to a source of a fluid 206, such as, but not limited to, air from an air compressor, that is injected into the top of the cathode. The air bubbles come out of the hollow interior of the cathode through the perforations. The movement of the air bubbles over the exterior surface of the cathode limits passivation of the cathode. Thus, the embodiments of the electrodes, electro-chemical cells, electrocoagulation systems, and methods of treatment of the present invention allow for high efficiency of pollutant removal with lower levels of passivation of the cathode. The lower levels of cathode passivation decrease power consumption, and thus, reduce cost of running the process.

Embodiments of the present invention include electrodes. The cathode described above, that is the perforated hollow cylinder with one ended closed, is one embodiment of the present invention. Some embodiments of the present invention are electrodes (articles used as electrodes) including at least one passageway or conduit within the electrode and including at least one access opening to access the passageway, and also including one or more distribution openings fluidly connecting the passageway to the exterior of the electrode. A fluid, such as a gas, may be injected into the conduit via the access opening and the fluid may exit the electrode by the distribution openings. Although both the access opening and the distribution opening provide access to the conduit, the term "access opening" refers to an opening intended for fluid entry into the conduit and the term "distribution opening" refers to an opening intended for fluid exiting the conduit. Based upon the disclosure herein, one of skill in the art will be able to determine the openings that are access openings and the openings that are distribution openings. In some embodiments, the distribution openings are of a smaller cross-sectional area than the access opening, than the average cross-sectional area of the passageway, or both. In some embodiments, the distribution openings have a cross-sectional area that is not more than the cross-sectional area of the access opening (or the smallest access opening if there is more than one). In some embodiments, the distribution openings are of have a smaller cross-sectional area than the sum of the cross-sectional areas of multiple access openings.

Figure 3A:
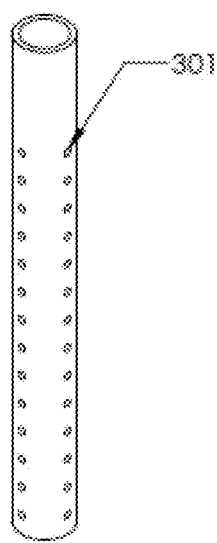
FIGS. 3A and 3B depicts a non-limiting embodiment of an electrode of the present invention shown in a three dimensional view and a lengthwise cross-section, respectively.
Figure 3B:
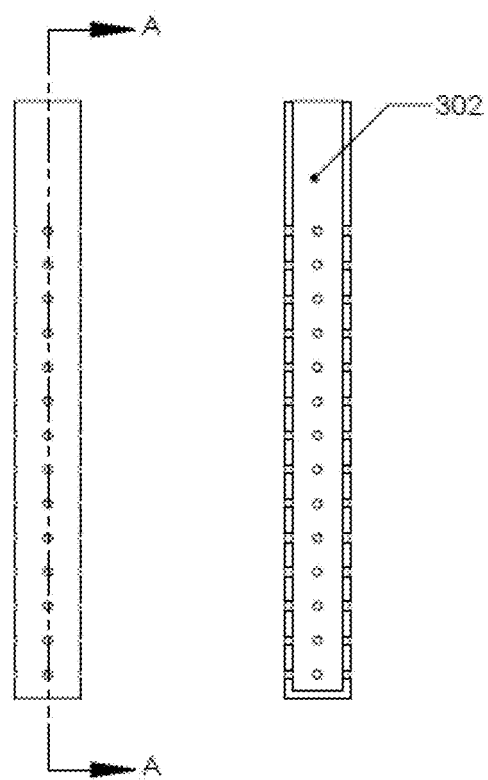

As shown in FIGS. 3A and 3B, depicting a non-limiting embodiment of the invention, the electrode is a hollow cylinder with one end closed (a tube with one closed end), and perforations, referred to as "distribution openings" 301, distributed both along its length and optionally around its circumference. The interior volume of the hollow cylinder forms a conduit 302 or passageway, and in some embodiments, the fluid flows into the conduit via the open end and out of the conduit via the distribution holes. Although the exemplary electrodes depicted in FIGS. 2, 3A and 3B are shown as a hollow cylinder, or tube, embodiments of the invention are not so limited. Furthermore, the closed end of the hollow cylinder is shown as being a flat surface, but embodiments of the invention are not so limited. In preferred embodiments, the electrode (article used as an electrode) is an elongated hollow article with one closed end and with a constant or essentially constant (varying by a maximum of 5%) cross-sectional area, and the cross-section being of any shape including, but not limited to, elliptical, polygonal, rectangular, oval, circular, and trapezoidal. In some embodiments, the cross-section of the electrode is irregularly shaped and/or of a free-form shape. The area of the electrode cross-section may be constant, or essentially constant (varying by a maximum of 5%), or may vary across the length of the electrode. The article serving as an electrode may be a hollow sphere with an access opening, and one or more distribution openings connecting the inside and the exterior. In some embodiments, the article is a sphere with a bore hole (that does not extend through the entire sphere, and/or is capped at one end if it extends through the entire sphere) and one or more distribution openings connecting the exterior and the bore hole (the conduit). In some embodiments, the electrode is irregularly shaped. In some embodiments, the closed end of a hollow object, such as and without limitation, a cylinder, may be hemi-spherically shaped, curved, or cone shaped. The electrode may be any article including a conduit within the article, the article including at least one access opening to access the conduit, and one or more distribution openings connecting the conduit inside and the exterior of the article and the access opening(s) being of a larger cross-sectional area than the distribution openings.

In some embodiments, the shape of the cross-section of the electrode varies across the length. In some embodiments, the variation in the area of the cross-section of the electrode is such that the ratio of the largest cross-sectional area to the smallest cross-sectional area is not more than 10, nor more than 8, not more than 5, or not more than 3 (and obviously in all cases, not less than 1, since a ratio of 1 is a constant cross-sectional area across the length of the article). In some embodiments, the variation in the area of the cross-section of the electrode is such that the ratio of the largest cross-sectional area to the smallest cross-sectional area is not more than 2.5, nor more than 2, not more than 1.75, not more than 1.5, or not more than 1.25 (and obviously in all cases, not less than 1, since a ratio of 1 is a constant cross-sectional area across the length of the article). In some embodiments, the variation in the cross-sectional area over the length of the electrode is such that the ratio of the largest cross-sectional area to the smallest cross-sectional area is not less than 1.06 and not more than 1.18. When referring to the variation in the cross-section of the article, the cross-sectional area of the object includes the entire cross-section including the area of the conduit. In other words, when referring to the variation in the cross-section of the article, the cross-section of a hollow cylinder is a circle, and not the area of the annulus around the conduit.

In some embodiments, the electrode cross-section of the electrode varies monotonically. In some embodiments, the electrode cross-section varies monotonically with the larger end including the access opening (at least one access opening) to the conduit and the smaller end being closed. In other words, the electrode may be tapered and the taper may be a line as shown in FIGS. 4A and 4B, or a curve, as shown in FIGS. 4C and 4D (where FIGS. 4A-4D depict non-limiting embodiments of the electrode), that illustrate a three dimensional view in FIGS. 4A and 4C and a corresponding lengthwise cross-section in FIGS. 4B and 4D. As shown in FIG. 4B angle 405 is less than 90°. Because the air bubbles help prevent passivation, it is believed that including the access opening at the small end may not inhibit passivation as much as including the access opening at the large end because the air bubbles may have less interaction with the surface of the electrode if the access opening is at the small end. Thus, in preferred embodiments, the cross-section of the electrode does not vary in a manner to create an obstacle to the flow of air bubbles up to the surface of the fluid, or does not vary in a manner to create areas with limited mixing and/or where bubbles of gas may be trapped.

In preferred embodiments, the electrode is an elongated article. The aspect ratio is the width to height of an object, or more generally, the ratio of longest dimension and the shortest dimension of an object. In some embodiments, the aspect ratio of the electrode is one, or about one (0.95 to 1.05), but in preferred embodiments, the aspect ratio is greater than one. In some embodiments, the aspect ratio of the electrode is at least 2, at least 3, at least 4, at least 5, at least eight, at least 10, or at least 15, and not more than 100. In some embodiments, such as any of those above, the aspect ratio does not exceed 50.

In some embodiments, the exterior surface of the electrode is relatively smooth. In some embodiments, the exterior surface of the electrode is not polished. In some embodiments, the exterior surface of the electrode is polished. In some embodiments, the exterior surface of the electrode is polished after each use. In some embodiments, the exterior surface of the electrode is polished after 4 to 24 hours after use.

In some embodiments, the aspect ratio of the conduit of electrode is one, or about one (0.95 to 1.05), but in preferred embodiments, the aspect ratio is greater than one. In some embodiments, the aspect ratio of the conduit of electrode is at least 2, at least 3, at least 4, at least 5, at least eight, at least 10, or at least 15, and not more than 100. In some embodiments, such as any of those above, the aspect ratio does not exceed 50. In some embodiments, the aspect ratio is a ratio of the length of the conduit to the average width and/or diameter of the cross-section of the conduit over the length of the conduit. With respect to the cross-section of the conduit, the cross-section of the conduit may be of any shape including, but not limited to, elliptical, polygonal, rectangular, oval, circular, and trapezoidal. In some embodiments, the cross-section of the conduit of the electrode is irregularly shaped and/or of a free-form shape. The area of the conduit cross-section may be constant, or essentially constant (varying by a maximum of 5%), or may vary across the length.

In some embodiments, the cross-sectional shape of the conduit varies across the length. In some embodiments, the variation in the area of the cross-section of the conduit is such that the ratio of the largest cross-sectional area to the smallest cross-sectional area is not more than 10, nor more than 8, not more than 5, or not more than 3 (and obviously in all cases, not less than 1, since a ratio of 1 is a constant cross-sectional area across the length of the article). In some embodiments, the variation in the area of the cross-section of the conduit is such that the ratio of the largest cross-sectional area to the smallest cross-sectional area is not more than 2.5, nor more than 2, not more than 1.75, not more than 1.5, or not more than 1.25 (and obviously in all cases, not less than 1, since a ratio of 1 is a constant cross-sectional area across the length of the article). In some embodiments, the variation in the cross-sectional area over the length of the conduit is such that the ratio of the largest cross-sectional area to the smallest cross-sectional area is not less than 1.06 and not more than 1.18.

Although the conduit 302 illustrated in the exemplary embodiment shown in FIG. 3B is essentially the inside of a tube, and may also be referred to as "a borehole," the embodiments of the invention are not so limited. In some embodiments, the conduit or passageway may have one or more crossbars and/or one or more grids across the passageway provided that fluid can pass through. In some embodiments, the interior wall surrounding the conduit is not smooth and/or free of protrusions.

The non-limiting embodiment of an electrode shown in FIG. 2 is a hollow cylinder, and may be referred to as a tube, with perforations (holes) both along its length and around its circumference. In some embodiments, the conduit is a different shape than the electrode. As a non-limiting example, the electrode may be an irregular shape, but the conduit may be in the shape of a cylinder (a borehole) of essentially constant (varying by a maximum of 5%) cross-sectional area. In preferred embodiments, the conduit and the article are essentially the same shape with one or more walls of the article separating the conduit from exterior. The one or more walls may be of constant or essentially constant (varying by a maximum of 5%) thickness, or may vary in thickness.

The electrode includes one or more distribution openings (or perforations) connecting the conduit to the exterior of the electrode. The distribution openings extend from the conduit that is the internal surface surrounding the conduit, to the exterior surface of the electrode. In some embodiments, the distribution openings are holes formed at pre-determined locations and do not include any pores. In some embodiments, the distribution openings may be a combination of pores and holes formed at pre-determined locations. In some embodiments, the distribution openings are only pores. In preferred embodiments, the distribution openings are holes formed at pre-determined locations, and do not include pores.

The distribution openings depicted in FIGS. 2, 3A, and 3B (labeled as 301 in FIG. 3A) are shown as essentially circular in cross-section, but the cross-section of the distribution openings is not so limited and the distribution openings may be of any shape or any combination of shapes, including, but not limited to including, elliptical, rectangular, circular, and polygonal. The distribution openings may be of an irregular cross-section. The distribution openings may be in the form of a channel or slit with a uniform or substantially uniform cross-sectional across the channel from the exterior surface of the article to conduit, where substantially uniform means not more than 5% variation in the cross-sectional area. The distribution openings may vary in shape and cross-sectional area across the channel from the exterior surface to the conduit. The aspect ratio of the opening of the distribution openings, either on the exterior surface of the electrode and/or on the conduit side of the electrode, may be 1, from 1 to 10, or in some cases greater than 10. The aspect ratio is the width to height of an object, or more generally, the ratio of longest dimension and the shortest dimension of an object. In this case, the aspect ratio is the longest dimension and the shortest dimension of the distribution opening.

The distribution openings allow the fluid entering the conduit of the electrode at the access opening to exit the article and bubble up through the water or other fluid in the electrocoagulation cell. The smallest cross-sectional area of the distribution opening from the exterior surface to the conduit will determine the velocity of the fluid exiting the perforations. Similarly, the same may apply to an access opening if the opening is in the form of a channel from the exterior to the interior. On the other hand, the "access opening" cross-section for a hollow cylinder with an open end is the interior cross-section of the open end of the cylinder. Thus, when referring to the cross-sectional area of a distribution opening and/or an access opening, unless specifically specified, the cross-sectional area is the smallest cross-section area of the channel from the exterior to the conduit. The cross-sectional area of the distribution opening may be at least 0.001% of the cross-sectional area of the access opening, the smallest cross-sectional area of the conduit, and/or the average cross-sectional area of the conduit. In some embodiments, the cross-sectional area of the distribution opening (average of all distribution openings or largest) is not more than 20%, not more than 15%, not more than 5%, not more than 4%, not more than 3%, not more than 2.5%, not more than 2%, not more than 1.5%, and/or not more than 1% of the cross-sectional area of the access opening, the smallest cross-sectional area of the conduit, and/or the average cross-sectional area of the conduit, where the smallest cross-sectional area of an access opening is the access opening cross-sectional area if there is more than one access opening for a conduit. In some embodiments, the cross-sectional area of the distribution opening (average of all distribution openings or largest) is not more than 20%, not more than 15%, not more than 5%, not more than 4%, not more than 3%, not more than 2.5%, not more than 2%, not more than 1.5%, and/or not more than 1% of the sum of the cross-sectional areas of the all access openings if there are two or more access openings. As depicted in the exemplary and non-limiting embodiment of FIGS. 2, 3A, and 3B, the perforations are the same cross-sectional area, or essentially, the same cross-sectional area (the standard deviation of the average of the cross-sectional areas of the perforations being not more than 5% of the average). However, the embodiments of the invention are not so limited, and the cross-sectional area of the perforations may vary significantly. In some embodiments, the cross-sectional area of the distribution openings varies such that the standard deviation of the average of the cross-sectional areas of the distribution openings is more than 5% of the average, and the distribution opening with the largest cross-sectional area is not more than 20%, not more than 15%, not more than 5%, not more than 4%, not more than 3%, not more than 2.5%, not more than 2%, not more than 1.5%, and/or not more than 1% of the cross-sectional area of the access opening, the smallest cross-sectional area of the conduit, and/or the average cross-sectional area of the conduit, where the access opening cross-sectional area is the smallest access opening cross-sectional area if there is more than one access opening for a conduit. In some embodiments, the cross-sectional area of the distribution openings varies such that the standard deviation of the average of the cross-sectional areas of the distribution openings is more than 5% of the average, and the distribution opening with the largest cross-sectional area is not more than 20%, not more than 15%, not more than 5%, not more than 4%, not more than 3%, not more than 2.5%, not more than 2%, not more than 1.5%, and/or not more than 1% of the sum of the cross-sectional area of the all access openings if there are two or more access openings.

The number of distribution openings may be as low as one, although more are preferred. The upper limit of the number of distribution openings is not specifically limited. As depicted in the non-limiting embodiment shown in FIG. 2, there are a number of distribution openings. The distribution openings may be evenly or substantially evenly (smallest to largest separation is less than 10% of the average separation with the separation measured from center to center) separated around the circumference to the electrode, or unevenly distributed. Similarly, the distribution openings may be evenly or substantially evenly (smallest to largest separation is less than 10% of the average separation where the separation is measured center to center) distributed lengthwise. The distribution openings may be staggered. As an example, the distribution openings may be placed in a spiral pattern as shown in FIGS. 5A-5C, that depict a non-limiting embodiment of an electrode with the top view of three cross-sections (across the circumference or width). As seen in FIGS. 5A-5C, there are 4 distribution openings about 90° apart around the circumference, but there is a 30° rotation of the openings at the next level etc. In some embodiments, there are at least six distribution openings—at least three groups lengthwise, each group being two or more around the circumference. In some embodiments, there are at least eight (8) distribution openings—at least four groups arranged along the length, each group being two or more around the circumference. In some embodiments, there are at least nine (9) distribution openings—three or more groups arranged along the length and each group being three or more distribution openings around the circumference. Because the electrode is intended to be partially immersed in the wastewater to be treated, the portion of the electrode nearest to the access opening may be free of distribution openings for some length to ensure that all of the distribution openings are immersed. In some embodiments, the top 10% to 20% of the length is free of distribution openings. In some embodiments, the top 5% to 30% of the length is free of distribution openings. The distribution openings are intended to distribute the incoming fluid in such a manner that the velocity of the exiting fluid is sufficient to provide some mixing to the water in the cell as well as to inhibit passivation of the surface of the electrode. One of skill in the art will be able to determine the size, shape, number, and placement of the distribution openings on the electrode exterior surface based upon the disclosure herein.

In some embodiments, the electrode is a more complex article. In some embodiments, the conduit is the annulus between two concentric hollow cylinders with one end sealed and the other end adapted to receive a flow of fluid such as a gas. The distribution openings may be on the outside cylinder exterior surface. In some embodiments, distribution openings may be on the inside cylinder surface, in addition to or instead of distribution openings on the outside cylinder exterior surface. In some embodiments, an annular passageway may be formed in a hollow cylinder that includes a solid insert in the center.

Figure 6:
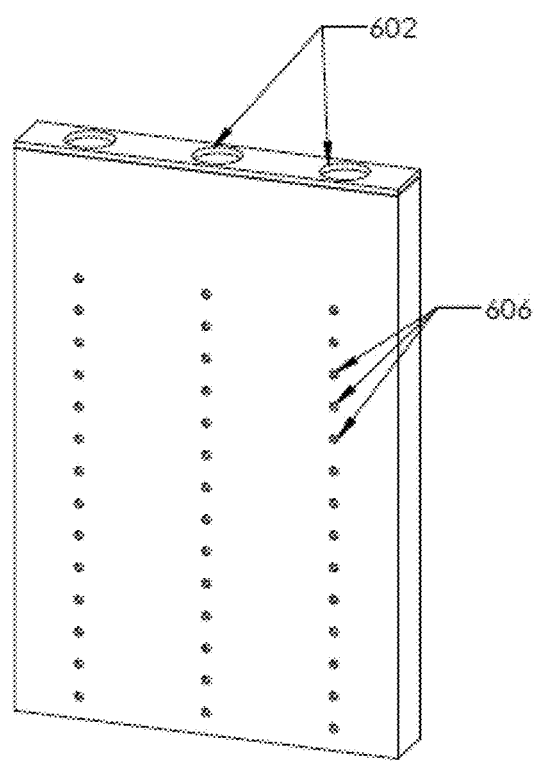
FIG. 6 depicts an additional non-limiting embodiment of an electrode of the present invention.

FIG. 6 depicts another exemplary and non-limiting embodiment. As shown in the embodiment of FIG. 6, the electrode is a plate with multiple bore holes 602, each bore hole forming both the conduit and an access opening (at the top), and distribution openings 606 fluidly connected to the bore holes. In some embodiments, the electrode is actually a series of electrodes connected together, where the electrodes connected together may be of the same shape or one or more different shapes. In preferred embodiments, the electrodes connected together are of the same shape and the same size or approximately the same size (within 5%).

In some embodiments, the distribution openings are holes and/or pores filled with or covered with a mesh. In some embodiments, a hole and/or slit is formed connecting the conduit to the exterior surface and a porous material, mesh, or the like is within the hole.

Figure 7:
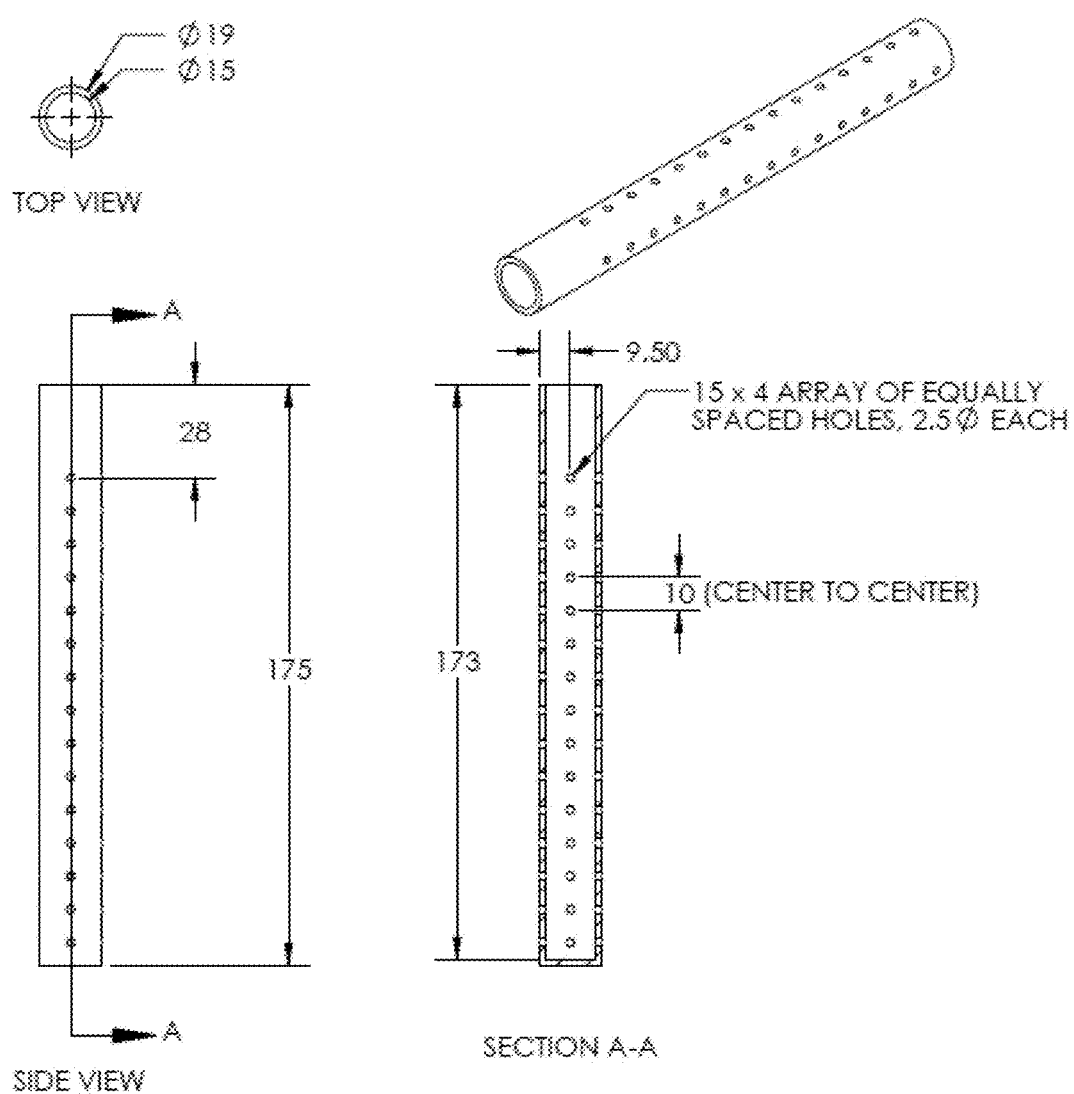
FIG. 7 depicts a non-limiting embodiment of an electrode of the present invention shown in a three dimensional view, a top view, and a lengthwise cross-section.

A non-limiting exemplary embodiment of an electrode is depicted in FIG. 7. It is a hollow aluminum cylinder, 19 mm outer diameter and 15 mm inner diameter, of 175 mm total length that is closed at one end thus forming a 173 mm conduit in the interior. The top portion of the open end of the cylinder is free of perforations, and the next portion includes 60 distribution opening arranged as a 15×4 array of distribution openings, each opening being of a circular cross-section of 2.5 mm in diameter. The array includes 4 distribution openings equally spaced around the circumference (~90° apart) repeated 15 times along the length of the cylinder with a separation of 10 mm measured from centerto-center of the distribution openings. From the top of the open end of the cylinder to the center of the first distribution opening is 28 mm and from the center of the last distribution opening to the bottom of the closed end of the cylinder on the interior is 5 mm (and from the center of the last distribution opening to the bottom of the closed end of the cylinder on the exterior is 7 mm).

Another non-limiting exemplary embodiment is an iron perforated cylinder, made from a commercial grade of iron, aluminum, or both iron and aluminum, being a hollow cylinder of 2.0 cm outer diameter, 1.6 cm inner diameter, and 13.3 cm in length, closed on one end, and including an array of perforations, 4 distribution openings of a circular cross-section of 2.5 mm in diameter around the circumference, where the 4 perforations around the circumference are repeated lengthwise starting about 5 mm from the bottom on the interior and separated by about 10 mm (center to center) leaving the top 16% of the length without perforations.

Figure 8:
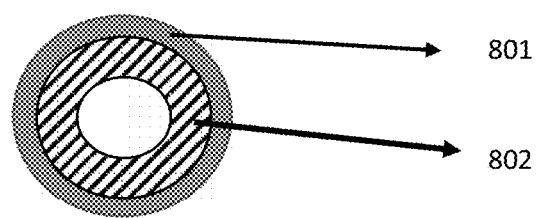
FIG. 8 depicts a non-limiting embodiment of an electrode connection to a fluid source.

In some embodiments, the top of the electrode is designed for injection of a fluid, such as, but not limited to, a gas. In some embodiments, the top of the electrode is open and thus provides an access opening to the conduit. In some embodiments, the electrode is a hollow cylinder with one closed end and the other end open, the open end allowing for fluid injection into the conduit. In some embodiments, fluid is injected in the conduit by placing a plastic tube, partially perforated, within the hollow cylinder with one end of the plastic tube being attached to a fluid source, such as but not limited to, an air compressor. FIG. 8 depicts a non-limiting example that shows the plastic tube 802 in contact with the interior wall of the hollow electrode 801, where the thickness of the tube and the electrode are not necessarily shown to size or at the proper thickness ratios. In some embodiments, the perforations in the plastic tube are about 0.5 mm in diameter. In some embodiments, the tube perforations are aligned with the perforations in the electrode. In some embodiments, the perforations in the plastic tube are about 0.5 mm in diameter and the tube perforations are aligned with the perforations in the electrode. In some embodiments, the tube fits within the electrode such that there is a friction fit between the interior walls of the electrode and the exterior walls of the tube. In some embodiments, the tube is perforated only in the section of the tube that is within the hollow cylinder. In some embodiments, the tube is perforated only over a portion of the end, the length of the perforated section of the tube being equal to or about equal to (within 5%) a length being the same as the distance from the end of the conduit (closed end for a hollow cylinder electrode) to the center of the distribution opening closest to the access opening (the open end for a hollow cylinder) as measured from the inside of the conduit. As a non-limiting example, for the embodiment of an electrode shown in FIG. 7, the perforated length of the tube would be 145 mm (total length as measured from the inside is 173 mm and the length from the open top of the electrode to the center of the distribution hole is 28 mm, so 173−28=145 mm). In some embodiments, the tube is a poly(vinyl chloride) tube of the type commercially available. Embodiments of the present invention are not limited to poly(vinyl chloride) tubes and embodiments encompass a tube formed of any material that allows for injection of the fluid. One of skill in the art will be able to determine the appropriate connections and/or size and number of perforations in the plastic tube based on the disclosure herein. The cross-sectional area and number of perforations in the tube may be varied depending upon the size and number of anodes and cathodes, the configuration of the anodes and cathodes, the surface area of the anodes and cathodes, the specific industrial application for which the electrodes are being used, the type, flow rate and pressure of the fluid, the type and amount of the wastewater to be treated, as well as other factors. As described herein, the air flowrate and perforation size in the electrode (and any tubing included therein for fluid delivery) may be adjusted to achieve sufficient mixing and/or to inhibit and/or to prevent the formation of passive layer on cathode surface.

Embodiments of the present invention are not limited to the type of connection for the fluid injection that are described in the paragraph above. In some embodiments, the top of the hollow cylinder is threaded on the exterior and/or interior to allow for a threaded connection. In some embodiments, the connection to the fluid source is a tube that is connected to a distributor and/or manifold that is in turn connected to the open end of the electrode, or an access opening of the electrode. In some embodiments, the tube connected to the fluid source has a diameter (and/or cross-sectional area) smaller than the diameter (and/or cross-sectional area) of the conduit and there is a connection allowing for the increase in diameter (and/or cross-sectional area), or vice-versa. In some embodiments, the connection to the electrode is fluid tight. In some embodiments, the connection to the electrode is not fluid tight, but at least 80 wt % (% by weight) of the fluid flowing from the fluid source to the electrode leaves the electrode via the distribution openings. In some embodiments, the connection to the electrode is not fluid tight, but at least 50 wt % of the fluid flowing from the fluid source to the electrode leaves the electrode via the distribution openings. In some embodiments, the electrode is manufactured such that a hose and clamp (or other tie) can be used to connect a tube for injection of a fluid.

The electrode is formed from one or more materials, at least one material being a metal or an alloy of one or more metals. An article that is formed from one or more materials where the one or more materials include, but are not limited to including, a metal is an article including a metal. An article including a metal alloy is an article including a metal as a metal alloy includes a metal. In those embodiments where the electrode is formed of one or more materials, and at least one material is not a metal and is not a metal alloy, the material(s) that are metals and/or metal alloys comprise at least 30 percent by volume of the electrode, at least 25 wt. % of the electrode, and/or a continuous phase is formed by metal(s), metal alloy(s), or a combination of the metal(s) and the metal alloys(s), where the totals sum to 100 wt % or 100 volume % (the metal in a metal alloy is not counted twice). In those embodiments where the electrode is formed of one or more materials, and at least one material is not a metal and is not a metal alloy, the material(s) are metals and/or metal alloys comprise at least 50 percent by volume of the electrode, and/or at least 50 wt. % of the electrode. In those embodiments where the electrode is formed of one or more materials, and at least one material is not a metal and is not a metal alloy, the material(s) are metals and/or metal alloys comprise at least 75 percent by volume of the electrode, and/or at least 75 wt. % of the electrode. In some embodiments, the electrode is formed of one or more materials and then coated and/or plated with a metal and/or a metal alloy. In some embodiments, the electrode is formed of one or more materials and then coated and/or plated with a metal and/or a metal alloy, where the metal and/or metal alloy of the plating are 0.01 wt % to 10 wt % of the electrode. Embodiments of the present invention encompass electrodes made of commercial grade metals and metal alloys as well as higher purity metals and metal alloys. It is understood the commercial grade metals may include small quantities of other metals or other materials. Thus, an article formed from aluminum may not assay at 100% aluminum if a commercial grade aluminum is used.

In some embodiments of the present invention are electrochemical cells including at least one electrode as described above, that is an electrode including a conduit, at least one access opening and one or more distribution openings. As used herein, a "flow through" electrode is an electrode as described herein including, but not limited to including, a conduit, at least one access opening to access the conduit and one or more distribution openings. Embodiments of the present invention encompass electrochemical cells including at least one flow-through electrode, where at least one flow-through electrode is used as a cathode (or the cathode), at least one flow-through electrode is used as an anode (or the anode), or at least one flow-through electrode is used as a cathode (or the cathode) and as an anode (or the anode). Embodiments of the present invention encompass electrochemical cells including one or more flow-through electrode(s), and the flow-through electrode(s) may be of any design, and, if more than one flow-through electrode is used, any combination of designs (including, as a non-limiting example, two flow-through electrodes of one design and another of a different design, etc.). In some embodiments, not all electrodes in the electrochemical cell are flow through electrodes, and other types of electrodes are used either as a cathode (or the cathode) and/or an anode (or the anode). In some embodiments, electrodes other than flow-through electrodes are used and the other electrode(s) may be of any type including, but not limited to including, a solid plate, a solid cylinder, and a solid rectangular rod. In preferred embodiments, the flow-through electrode is of a generally cylindrical shape, and the other electrode(s) present are solid cylinders, and in more preferred embodiments, the other electrode(s) present are solid cylinders of the same or essentially the same (within 5%) outer diameter and length as the flow-through electrode. In some embodiments, the other electrode(s) are formed from the same materials as the flow-through electrode. In some embodiments, the other electrode(s), include, but are not limited to including, at least one of the same metal(s), at least one of the same metal alloy(s), or both at least one of the same metal(s) and at least one of the same metal alloy(s) as the flow-through electrode(s). In some embodiments, the anode and the cathode are different metals. Non-limiting examples include a cathode of including, but not limited to including, iron, and an anode including, but not limited to including, aluminum. Non-limiting examples also include an anode including, but not limited to including, iron, and a cathode including, but not limited to including, aluminum.

The electrodes may be used in various configurations. One exemplary and non-limiting configuration is shown in FIG. 2. Another configuration, referred to as monopolar parallel configuration, involves alternating anodes and cathodes (anode-cathode-anode-cathode) where all anodes are connected together and connected to the power supply and similarly all of the cathodes are connected together and connected to the power supply. Another configuration, also referred to as monopolar series, also involves alternating anodes and cathodes where only the outside anode and cathode are connected to the power supply, and the inside anodes and cathode pairs are connected only to each other, and not the power supply or the outside anode or cathode (in the configuration ({anode(1)-cathode(1)-anode(2)-cathode(2)-anode(3)-cathode(3)}, anode (1) and cathode (3) are connected to the power supply and cathode (1) is connected to anode (2), and cathode (2) is connected to anode (3)). Another potential configuration, referred to as bipolar series, involves connecting the outermost anode and cathode to the power supply and not connecting the other anodes and cathodes to anything (for {anode(1)-cathode(1)-anode(2)-cathode(2)-anode(3)-cathode(3)}, anode (1) and cathode (3) are connected to the power supply and the remaining anodes and cathodes are not connected to the power supply or an electrode)). In any of the configurations described herein, one or more cathodes, one or more anodes, or both one or more cathodes and one or more anodes may be a flow-through electrode.

The vessel used to contain the water to be treated, or more specifically, an aqueous solution/suspension (wastewater), may be any vessel that can contain the aqueous solution/suspension without leakage. In some embodiments, the vessel should be one that does not conduct electricity. The vessel or container may include a top that allows for the at least partial immersion of the electrodes into the aqueous solution/suspension. Alternatively, a rack and/or other device(s) may be used to hold the electrodes in a position such that electrodes are at least partially immersed in the aqueous solution/suspension to be treated. In preferred embodiments, the electrodes do not sit on the bottom of the container whether held in place by a rack and/or held in place by the top of the electrochemical cell.

The electrochemical cell is designed to be used with water to be treated, or more specifically, wastewater, as the electrolyte. The electrolyte used in the electrochemical cell is not so limited and the electrochemical cells of the present invention may use any suitable electrolyte. However, in preferred embodiments, the electrolyte is water to be treated, is an aqueous solution/suspension. As used herein, the term "wastewater" encompasses an aqueous solution/suspension including some substances that are dissolved and/or suspended and it is desirable to reduce the amount of one or more of the substances and/or otherwise treat the water, such as adjusting the pH. The term "wastewater" encompasses, but is not limited to, aqueous products (that may be "by-products") of industrial or other processes as well as conventional household sewage. In some embodiments, the wastewater used as the electrolyte in the electrochemical cell (electrocoagulation unit) is at least 50 wt. % (percent by weight) water, at least 60 wt. % water, at least 70 wt. % water, at least 65 wt. % water, at least 75 wt. % water, at least 80 wt. % water, at least 85 wt. % water, at least 90 wt. % water, at least 95 wt. % water, and/or at least 98 wt. % water. In some embodiments, the sodium content of the wastewater is at least 50 mg/liter. In some embodiments, the sodium content of the wastewater is at least 75 mg/liter. In some embodiments, the sodium content of the wastewater is at least 100 mg/liter. In some embodiments, the sodium content of the wastewater is at least 150 mg/liter. In some embodiments, the sodium content of the wastewater is at least 200 mg/liter. In some embodiments, the sodium content of the wastewater is at least 250 mg/liter. In some embodiments, such as, but not limited to, any of those described herein, the sodium content of the wastewater is not more than 15,000 mg/liter. The viscosity of the wastewater may be low enough to be pumped. The wastewater may include, but is not limited to including, dissolved petroleum products, dissolved minerals, heavy metals, sand, silt, clay, wax, and in some cases, naturally occurring radioactive materials, and any combinations thereof. The wastewater may have any electrical conductivity.

The electrochemical cell includes at least one current/power supply and at least one source of a fluid, such as air, for injecting into at least one flow-through electrode. The power supply can be a direct current power supply, an alternating current power supply, a power supply capable of providing pulsed alternating current, or, in some cases, a combination thereof. In some embodiments, the power supply is capable of providing direct current, alternating current power supply, and/or pulsed alternating current. In some embodiments, there are multiple power supplies.

The fluid injected into the flow through electrode may be a gas or supercritical fluid. In preferred embodiments, the fluid injected into the flow through electrode is a gas, such as, but not limited to, air, nitrogen, helium, and argon. In some embodiments, another inert gas or combination of inert gases may be used. In some embodiments, a decrease in the pH is desirable, and a fluid including some carbon dioxide may be used. The fluids, such as gases, may be used individually or in combination with other fluids including, but not limited to including, those described herein.

The electrochemical cell may be designed to operate in a batch mode or a continuous mode. In some embodiments, the electrochemical cell is part of an electrocoagulation system operating in a continuous mode where wastewater to be treated flows into the electrochemical cell from a feed tank and at the same time water flows out of the electrochemical cell to a settling tank. It is understood that an electrocoagulation system may include one or more electrochemical cells and each electrochemical cell may include one or more pairs of electrodes, and the electrodes may be in any arrangement. In some embodiments, multiple electrochemical cells are included in the system and each electrochemical cell is attached to a different power supply. A system may include one or more wastewater inlets and one or more treated wastewater outlets.

Embodiments of the present invention also encompass methods of treatment of wastewater with electrocoagulation. In some embodiments, the methods include at least partially immersing one or more cathodes and one or more anodes into wastewater to be treated, where at least one of the one or more cathodes and at least one of the one or more anodes are connected to a power supply, and the cathode, anode, or both are flow-through electrodes, and applying a current to the cathode and anode while also injecting a fluid into at least one flow-through electrode, where the electrode through which fluid is injected may be connected to the power source or may not be connected to a power source and may be connected to another electrode or may not be connected to another electrode. In preferred embodiments, there is at least one flow-through electrode that is connected to the power supply and through which fluid is injected. In preferred embodiments, fluid is injected into all flow-through electrodes of the cell and/or system. The injection of the fluid into at least one flow through electrode may occur before or after the initiation of the current as long as there is some time period during which the current is applied and the fluid is being injected. The cessation of the current may occur before or after the cessation of the fluid injection. In some embodiments, the fluid flow through the flow-through electrode is initiated prior to the initiation of the at least partial immersion of the electrode in the wastewater. In some embodiments, the current flow is turned off before the flow of fluid through the flow-through electrode is turned off.

In preferred embodiments, the methods of treatment are performed at ambient temperature and pressure. In other words, the temperature of the wastewater is not adjusted to a specific temperature prior to the treatment, and the environment where the treatment occurs is not adjusted to a specific temperature. Moreover, the treatment system is not placed under compression or vacuum, with the top of the fluid in the electrochemical cell being at ambient pressure. In preferred embodiments, the pressure at the top fluid level of the electrochemical cell of the system is normal atmospheric pressure, with some normal variations around normal (760 mm Hg±100 mm Hg). In preferred embodiments, the temperature of the wastewater before the initiation of treatment is 18° C. to 25° C., and the temperature of the environment where the system operates is in the range of 18° C. to 25° C. In some embodiments, the temperature of the water increases by not more than 5° C. during continuous operation. In some embodiments, the temperature of the water increases by not more than 3° C. during continuous operation.

In some embodiments, the temperature of the environment of the method of treatment is in the range of 5° C. to 55° C. In some embodiments, the temperature of the environment of the method of treatment is in the range of 5° C. to 50° C. In some embodiments, the temperature of the environment of the method of treatment is in the range of 10° C. to 45° C.

In some embodiments, the pH of the wastewater is adjusted before treatment. In some embodiments, if the pH is outside the range of 4 to 8, the pH is adjusted to be within this range. In some embodiments, if electrode is formed from one or more materials, the one or more materials including, but not limited to including, iron, the pH may be adjusted to be in the range of 7.5-9.5, and preferably, in the range of 8-9. In some embodiments, if the electrode is formed from one or more materials, the one or more materials including, but not limited to including, aluminum, the pH may be adjusted to be in the range of 6-8, and preferably, in the range of 6.5-7.5.

For the methods of wastewater treatment, the fluid injected into the flow through electrode may be a gas or supercritical fluid. In preferred embodiments, the fluid injected into the flow through electrode is a gas. Non-limiting examples of gases that may be used with the embodiments of the invention include air, nitrogen, helium, argon, and combinations thereof. In some embodiments, carbon dioxide may be used. The fluids for use with the methods of the present invention may be used individually, or in combination, including, but not limited to including, in combination with those fluids specifically mentioned herein. Different fluids may be injected into different electrodes or the same fluid may be injected into several different electrodes. In some embodiments, two or more different fluids, each from a different source, are injected into an individual electrode. In some embodiments, multiple fluid sources are connected to an individual electrode, where the fluids of the multiple fluid sources may be the same fluid or different fluids. A different fluid includes, but is not limited to including, a different proportion of the same gases as used in another fluid. In general one or more fluids may be injected into one or more flow through electrodes, where the fluids may be from one or more fluid sources, and the fluids of the individual fluid sources may be the same or different. In some embodiments, the electrode is formed from one or more materials, the one or more materials including, but not limited to including, iron, and the gas includes not more than 5 percent by volume oxygen (vol % or % by volume), preferably, not more than 2 vol % oxygen (and obviously, no oxygen, that is 0 vol % is the lowest amount of oxygen). In some embodiments, the electrode is formed from one or more materials, the one or more materials including, but not limited to including, iron, and the gas includes not more than 0.5 vol % oxygen, and/or not more than 0.1 vol % oxygen.

The fluid injected provides mixing of the wastewater in the vessel as well as inhibition of passivation, and/or cleaning of the electrode surface. In some embodiments, the fluid flow through the electrode is the only source of mixing in the electrochemical cell. In some embodiments, in addition to the fluid flow through the electrode, there is additional source of mixing and/or agitation. The additional mixing may be accomplished using any known mixing means suitable for use with the electrochemical cell and the electrodes used with the electrochemical cell. As a non-limiting example, the electrochemical cell may be placed on a magnetic stir-plate with a magnetic stirrer in the bottom of the cell. The fluid flow rate will vary depending upon the size of the electrodes, the number and size of the distribution openings, and the volume of the electrochemical cell. The fluid flow should be sufficient to inhibit, or partially inhibit, the passivation of the electrode, and specifically, the cathode. Based upon the disclosure herein, one of skill in the art will be able to determine the appropriate fluid flow rate to at least partially inhibit and/or reduce passivation of the electrode as compared to passivation when using a non-flow through electrode.

In some embodiments, the current applied is direct current. In some embodiments, the current applied is alternating current. In some embodiments, the current applied is alternating current at a frequency of 60 Hertz (Hz). In some embodiments, the current applied is pulsed alternating current, that is the current is from a DC (direct current) power supply and the polarity is switched at predetermined times (pulsed alternating current has a rectangular wave shape in contrast to what is normally referred to as alternating current (AC), that has a sinusoidal wave pattern). In some embodiments, the pulsed alternating current is pulsed at 60 Hz. In some embodiments, the current density, that is current per area of electrode, may be in the range of 5 mA/cm$^2$ to 25 mA/cm$^2$. In some embodiments, the current density, that is current per area of electrode, may be in the range of 10 mA/cm$^2$ to 20 mA/cm$^2$. If the current density is too high, the current may heat the water, and this is inefficient. In addition, excessive production of gas bubbles from the anode or the cathode may also decrease efficiency. In general, the generation of metal ions is a function of current density. Thus, there is an optimum current density. One of skill in the art can determine the optimum current density based upon the disclosure herein. The current density may vary depending upon the current type—that is direct current, alternating current, or pulsed alternating current, and the frequency of the alternating current and/or pulsed alternating current.

Embodiments of the present invention encompass systems for water treatment including, but not limited to including, systems for use in the methods of treatment described herein. The systems for water treatment expressly include, but are not limited to including, one or more flow through electrodes, one or more fluid sources connected to at least one of the one or more flow through electrodes, and one or more power supplies, each power supply connected to at least one electrode serving as an anode and at least one electrode serving as a cathode, where the flow through electrode through which the fluid is injected may or may not be connected to one of the one or more power supplies.

Based upon the disclosure herein, one of skill in the art will be able to scale-up the electrodes, electrochemical cells, and systems.

Some non-limiting embodiments of the present include the following:

Embodiment 1: Electrochemical cells including, but not limited to including:
an article including, but not limited to including, a metal; and the article including, but not limited to including, a conduit, one or more access openings to access the conduit, and one or more distribution openings providing access to the conduit, the largest cross-sectional area of each of the distribution openings being not more than 5% of the average cross-sectional area of the conduit, not more than 5% of the area of the smallest of the access openings, or both.

Embodiment 2: In some embodiments, such as but not limited to embodiment 1, the article has an aspect ratio greater than one.

Embodiment 3: In some embodiments, such as but not limited to embodiment 2, the article has an aspect ratio of two or more.

Embodiment 4: In some embodiments, such as but not limited to embodiment 3, the article has an aspect ratio of five (5) or more.

Embodiment 5: In some embodiments, such as but not limited to any of embodiments 1-4, the article has an aspect ratio of not more than twenty (20).

Embodiment 6: In some embodiments, such as but not limited to any of embodiments 1-5, the article is a hollow cylinder with one end sealed and one end comprising the one or more access openings.

Embodiment 7: In some embodiments, such as but not limited to embodiment 6, the one or more distribution openings are distributed around the circumference and/or along the length of the cylinder.

Embodiment 8: In some embodiments, such as but not limited to any of embodiments 1-8, the article comprises 90 wt % (percent by weight) or more of one or more metals.

Embodiment 9: In some embodiments, such as but not limited to any of embodiments 1-8, the article comprises iron, aluminum, or a combination thereof.

Embodiment 10: Electrochemical cells including, but not limited to including, one or more electrodes, at least one of the one or more electrodes being any one of embodiments 1-9.

Embodiment 11: In some embodiments, such as but not limited to embodiment 10, the at least one electrode is a cathode.

Embodiment 12: In some embodiments, such as but not limited to embodiment 11, the electrochemical cell also includes, but is not limited to including, one or more anodes, at least one of the one or more anodes being a solid cylinder.

Embodiment 13: In some embodiments, such as but not limited to embodiment 11, the electrochemical cell also includes, but is not limited to including, one or more anodes, at least one anode being any one of embodiments 1-9.

Embodiment 14: In some embodiments, such as but not limited to, embodiments 11-13, the electrochemical cell includes, but is not limited to including, one or more anodes, and the cathode comprises aluminum and the anode comprises aluminum.

Embodiment 15: In some embodiments, such as but not limited to, embodiments 11-13, the electrochemical cell includes, but is not limited to including, one or more anodes, and the cathode comprises iron and the anode comprises iron.

Embodiment 16: In some embodiments, such as but not limited to, embodiments 11-13, the electrochemical cell also includes, but is not limited to including, one or more anodes, and at least one or the cathode comprises iron and at least one anode comprises aluminum.

Embodiment 17: In some embodiments, such as but not limited to, embodiments 11-13, the electrochemical cell also includes, but is not limited to including, one or more anodes, the at least one anode comprises iron and at least one or the cathode comprises aluminum.

Embodiment 18: Methods of treating water and/or an aqueous solution/suspension, the method including, but not limited to including: applying current to at least one anode of one or more anodes and to at least one cathode of one or more cathodes, the one or more anodes and the one or more cathodes being at least partially immersed in the water and/or an aqueous solution/suspension to be treated; and injecting gas through at least one access opening of at least one cathode, the at least one cathode being any one of embodiments 1-9, such that the gas at least partially exits the at least one cathode through at least one of the one or more distribution openings; wherein the at least one cathode through which gas is injected may or may not have current applied.

Embodiment 19: In some embodiments, such as but not limited to embodiment 19, the injected gas is nitrogen.

Embodiment 20: In some embodiments, such as but not limited to embodiment 19, the injected gas is air.

Embodiment 21: In some embodiments, such as but not limited to, embodiments 18-20, the applied current is direct current.

Embodiment 22: In some embodiments, such as but not limited to, embodiments 18-20, the applied current is alternate pulsed current.

Embodiment 23: In some embodiments, such as but not limited to, embodiments 18-22, the method is run in batch mode.

Embodiment 24: In some embodiments, such as but not limited to, embodiments 18-22, the method is run in continuous mode.

EXAMPLES

The examples presented in this section are provided by way of illustration of the current invention only and are not intended nor are they to be construed as limiting the scope of this invention in any manner whatsoever.

Example 1—Comparison of Electrode Shapes and Configurations

Electrocoagulation experiments were carried out in a batch mode with different electrode shapes. In the batch mode of operation, water is not pumped in and out of the cell during the experiment. The electrochemical cell used was a 1.8-liter Plexiglas™ cylindrical cell. The electrodes were of different geometries, but each electrode had a surface area of 83.7 cm$^2$, and the 83.7 cm$^2$ surface area is the net surface area after subtracting out the area of the perforations for electrodes with perforations (also referred to as "distribution openings"). The electrodes were made of commercial grade aluminum. The electrodes were placed in the vessel such that the electrodes were at least partially immersed, but not touching the bottom of the vessel and not touching each other. The electrodes were attached via alligator clips to a wire leading to a direct current power supply (manufacturer Rigol) that supplied sufficient current to reach a current density of 15 mA/cm$^2$. An air flowrate of 15 standard cubic feet per hour (SCFH), provided by an air compressor, was used for the injection, and the injection point depended upon type of electrodes used. The injected air provided the mixing for the electrochemical cell. Electrocoagulation was carried out for 30 minutes without any control temperature and pressure of the environment (in other words, the temperature was room temperature, that is in the range of 18° C. to 25° C., and at normal atmospheric pressure, that is 760 mm Hg±100 mm Hg).

The 1.8 liter Plexiglas™ cylindrical cell was filled with 1,800 milliliters of wastewater. The wastewater used in the experiment was "synthetic produced water," that is water made to simulate produced water. The simulated produced water was made by starting with seawater, having a conductivity ranging between 40-45 mS/cm (prior to evaporation), removing some water by evaporation to further increase salinity, and then adding oil to the water and homogenizing the oil and water. The properties of the synthetic water used in the experiment are provided in Table 1 below:

TABLE 1

| Characteristics of Synthetic Produced Water | |
|---|---|
| pH | 7.5 |
| Conductivity | 129 mS/cm |
| Total Dissolved Solids (TDS) | 97 g/liter |
| Oil and Grease (O & G) | 360 ppm |
| Total Organic Carbon (TOC) | 350 ppm |
| Total Petroleum Hydrocarbons (TPH) | 2300 ppm |

The pH was measured using a YSI, EcoSense™ (pH 100) pH meter. The conductivity and TDS were measured using a YSI, EcoSense™ (EC-300) conductivity meter, where a correlation allows for the determination of TDS from conductivity. The TOC was measured using a "TOC-L-CSH" device supplied by Shimadzu Corporation. The TPH was measured using the standard USA EPA method 8015 for non-halogenated organics, that uses gas chromatography with a flame ionization detector (GC/FID).

Three different types of electrode shapes were evaluated. All three electrodes evaluated were made from aluminum. The first design was a plate electrode of 3 cm×14 cm of 0.30 cm thickness. The second electrode design was a solid cylinder of 1.8 cm outer diameter and 14.8 cm in length. The third was a perforated cylinder, illustrated in FIG. 7. As shown in FIG. 7, the electrode is a hollow cylinder of 1.9 cm outer diameter, 1.5 cm inner diameter, and 1.75 cm in total length, closed on one end, and including 60 distribution openings of 2.5 mm diameter, arranged as a 4×15 array. The distance from the top of the open end to the center of the first distribution opening is 28 mm, and then the distribution openings are arranged as an array of 4 openings equally distributed around the circumference repeated 15 times over the length of the cylinder with 10 mm center to center separation of the openings lengthwise. Thus, the distance from the center of the last distribution opening to the bottom of the interior of the electrode is 5 mm. The top of the perforated cylinder was open to allow for placement of a poly(vinyl chloride) (PVC) tube, partially perforated, into the electrode such that the wall of the tube contacted the interior of the wall of the hollow electrode, as illustrated in FIG. 8. The PVC tube had perforations of about 0.5 mm in diameter over the first 145 mm at the end that was inserted into the electrode. The perforations in the PVC tube coincided with the perforations in the electrode. The other end of the PVC tube was connected to an air compressor to supply air by a connection to a tube of slightly smaller diameter that was connected to a flow rate meter connected to the air compressor.

Five configurations were evaluated as disclosed in Table 2 below:

TABLE 2

Electrode Configurations

| Config. | Anode | Cathode |
|---|---|---|
| 1 | Plate | Plate |
| 2 | Solid Cylinder | Solid Cylinder |
| 3 | Perforated Cylinder | Solid Cylinder |
| 4 | Solid Cylinder | Perforated Cylinder |
| 5 | Perforated Cylinder | Perforated Cylinder |

As noted above, the location of injection of the 15 SCFH air depended upon the electrodes used. For configurations 1 and 2 shown in Table 2, the air was injected at the bottom of the cell through a plastic hose. For configurations 3 and 4, the air was injected into the center of the perforated cylindrical electrode. For configuration 5, the air was injected into both of the perforated cylindrical electrodes, but the total quantity of air remained the same. Therefore, in configuration 5, the airflow through each electrode was half the airflow through the perforated cylinder electrode of configuration 3 or 4.

The treated water was analyzed for TOC, TPH, and O & G. The results of the analyses are shown in Table 3 below:

TABLE 3

Percent Reduction in Organic Contaminants

| | Parameter Measured | | |
|---|---|---|---|
| Config. | TOC | TPH | O & G |
| 1 | 92.6% | 96.3% | 94.9% |
| 2 | 97.1% | 97% | 96.8% |
| 3 | 95.7% | 96.7% | 96.3% |
| 4 | 98.3% | 99% | 98.1% |
| 5 | 97.7% | 97.3% | 97.2% |

In addition, the power consumption and the potential difference between the two electrodes was measured during the course of the experiments. The results for the various configurations are shown in Table 4 below:

TABLE 4

Potential Difference and Power Consumption

| Config. | Initial potential difference (V) | Final Potential Difference (V) | Power Consumption (W) |
|---|---|---|---|
| 1 | 2.5 | 8.2 | 6.96 |
| 2 | 2.5 | 4.6 | 4.62 |
| 3 | 2.6 | 3.2 | 3.77 |
| 4 | 2.4 | 2.4 | 3.12 |
| 5 | 2.5 | 3.1 | 3.64 |

As shown in the two tables above, when both the anode and the cathode were plates, the power consumption was the highest, and the reduction in the TOC, TPH, and O & G was the lowest. In contrast, the lowest power consumption, and the highest reduction in TOC, TPH, and O & G was observed for configuration 4, with a solid cylinder for the anode and a perforated cylinder for the cathode. The second best was configuration 5 with both electrodes being perforated cylinders. With respect to reduction in the TOC, TPH, and O & G, the configuration in the middle was configuration 2, with both electrodes being solid cylinders. However, with respect to power consumption, configuration 3, using a perforated cylinder for the anode and a solid cylinder for the cathode, was in the middle.

A visual observation of the cathodes at the end of the experiment showed that both the solid plates and solid cylinders were coated with a thick continuous white layer, an indication of significant passivation of the cathode. The least passivation was observed for the perforated cathode used in configuration 4, with a solid cylinder as the anode. In configuration 4, the cathode was relatively clean. In the middle was the cathode used in configuration 5, that is with both cathode and anode being perforated cylinders. For the cathode in configuration 5 there was a white layer on the surface of the cylinder, but it was not well attached to the cathode surface and appeared to be peeling off.

Example 2—Results for Continuous Operation

Electrocoagulation in a continuous operation mode was run using configuration 4—an anode being a solid aluminum cylinder, and a cathode being a perforated aluminum cylinder. The optimum parameters for electrocoagulation had been determined in other experiments. The parameters used for the continuous operation, previously determined to be the optimum parameters, were an air flow of 15.5 SCFH, a pH of 6, and a current density of 17 mA/cm$^2$. The 1.8 liter Plexiglas™ cylindrical cell was used again as the electrochemical cell with a 1.8 liter feed tank for the input into the electrochemical cell and a 1.8 liter settling tank into which the output of the electrochemical cell was pumped. A flow rate of 63.3 ml/min was used and this resulted in a residence time of about 30 minutes (specifically, 28.4 minutes). The total duration of the continuous operation was about 90 minutes. At each 10 minutes, a sample was taken from the electrochemical cell outlet. The results are presented in Table 5 below:

TABLE 5

Electrocoagulation Continuous Operation Results

| Time (min) | TOC, percent removal | Potential Difference (V) | Power Consumption (W) |
|---|---|---|---|
| 0 | 0% | 2.47 | 3.46 |
| 10 | 12.8% | 2.45 | 3.43 |
| 20 | 91.7% | 2.45 | 3.43 |
| 30 | 94.3% | 2.46 | 3.44 |
| 40 | 94.7% | 2.45 | 3.43 |
| 50 | 95.8% | 2.44 | 3.42 |
| 60 | 95% | 2.43 | 3.40 |
| 70 | 95.6% | 2.43 | 3.40 |
| 80 | 95.8% | 2.46 | 3.44 |
| 90 | 96.8% | 2.5 | 3.50 |

In addition, observation of the cathode at the end of the 90 minute experiment showed some formation of a white layer on the cathode, but it was peeling off and not tightly attached to the surface. Analysis of the sample removed from the outlet of the electrochemical cell (electrocoagulation reactor) at the end of the 90 minutes showed 96.8% removal of TOC as seen in Table 5 above, and 97.9% removal of O & G, and 94.6% removal of TPH.

All publications, patents, and patent applications cited in this specification are herein incorporated by reference as if each individual publication, patent, or patent application were specifically and individually indicated to be incorporated by reference.

While particular embodiments of the present invention have been shown and described, it will be obvious to those skilled in the art that changes and modifications can be made without departing from this invention in its broader aspects. Therefore, the claims are to encompass within their scope all such changes and modifications as fall within the true spirit and scope of this invention. Moreover, although individual aspects or features may have been presented with respect to one embodiment, a recitation of an aspect for one embodiment, or the recitation of an aspect in general, is intended to disclose its use in all embodiments in which that aspect or feature can be incorporated without undue experimentation. Also, embodiments of the present invention specifically encompass embodiments resulting from treating any dependent claim which follows as alternatively written in a multiple dependent form from all prior claims which possess all antecedents referenced in such dependent claim (e.g. each claim depending directly from claim 1 should be alternatively taken as depending from any previous claims where such dependency would be logically consistent).

What is claimed is:

1. A method of treating wastewater with an electrochemical cell, wherein the electrochemical cell comprises a cathode and an anode, wherein the cathode and the anode comprise a metal and the cathode comprises a conduit, wherein the cathode comprises one or more access openings to access the conduit, and a plurality of distribution openings fluidly connecting the conduit to an exterior of the cathode, a cross-section area of the largest distribution opening of the plurality of distribution openings being not more than 5% of the average cross-sectional area of the conduit, not more than 5% of the area of the smallest of the access openings, or both, wherein the anode is a solid cylinder, and wherein the metal of the cathode comprises iron and the anode comprises a metal of aluminum, or the metal of the anode comprises iron and the metal of the cathode comprises aluminum, the method comprising:
   applying current to the anode and to the cathode, the anode and the cathode being at least partially immersed in the wastewater to be treated; and
   injecting gas through at least one of
      at least one access opening of the cathode such that the gas at least partially exits the cathode through at least one of the plurality of distribution openings, or
      at least one access opening of a different cathode to which current is applied such that the gas at least partially exits the different cathode through at least one of a plurality of distribution openings fluidly connecting a different conduit of the different cathode to an exterior of the different cathode;
   wherein the plurality of distribution openings of the cathode are arranged as an array of openings equally distributed around a circumference of the cathode.

2. The method of claim 1, wherein the injected gas is selected from a group consisting of air, nitrogen, helium and argon, and combinations thereof.

3. The method of claim 2, where the applied current is direct current.

4. The method of claim 2, where the applied current is an alternating pulsed current.

5. The method of claim 1, run in batch mode.

6. The method of claim 1, run in continuous mode.

* * * * *